Feb. 10, 1953     D. E. HOOKER     2,627,945
INDEXING MECHANISM
Filed May 2, 1947
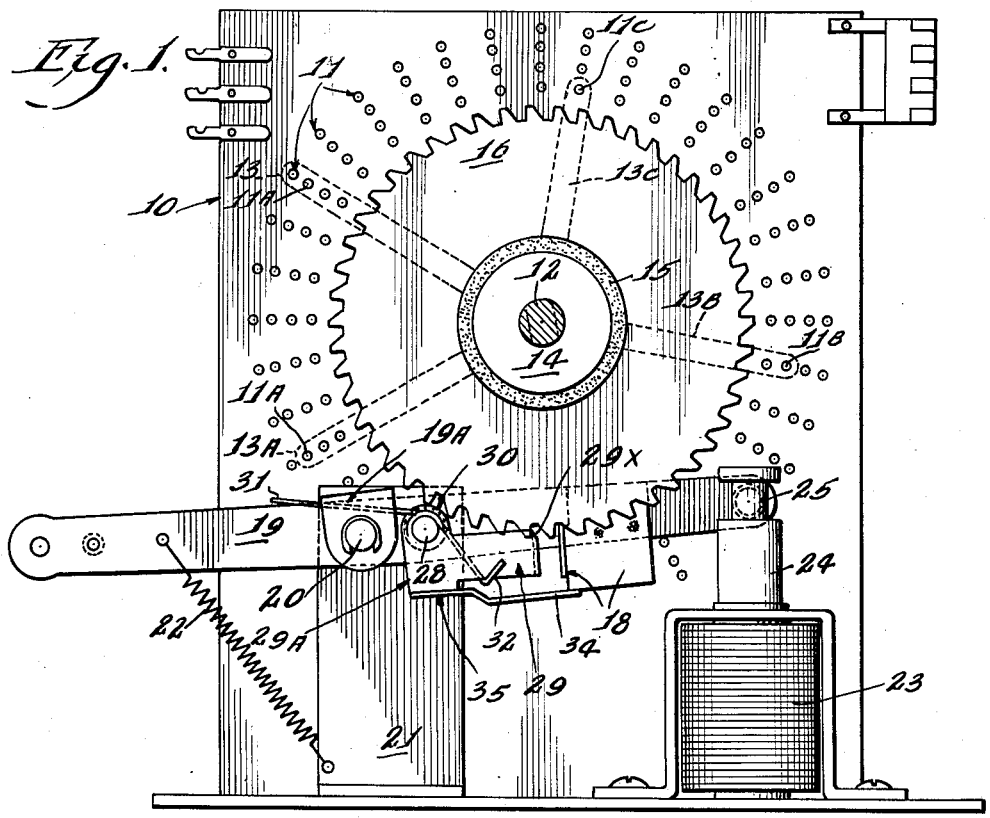
Inventor.
Donald E. Hooker.

Patented Feb. 10, 1953

2,627,945

UNITED STATES PATENT OFFICE 2,627,945

INDEXING MECHANISM

Donald E. Hooker, Skokie, Ill., assignor to Raymond T. Moloney, Chicago, Ill.

Application May 2, 1947, Serial No. 745,394

10 Claims. (Cl. 188—69)

This invention pertains to mechanical indexing means of general application but especially suitable for use with totalizers and score registering mechanisms in amusement and game apparatus.

The principal object of the improvement is the provision of an indexing pawl structure contrived to engage a toothed disc in a manner such that the pawl always engages in a notch of the disc notwithstanding that irregularities in speed of the disc may cause the same to gain or lose relative to a proper registering relationship with the indexing pawl.

Stated otherwise, it is an object of the invention to provide a novel compound pawl for indexing purposes which greatly reduces the occurrence of dead-center stops, by which is meant the frequent arrest of the toothed index disc with the pawl on the apex of the tooth instead down in the notch or root.

Another object is the provision of indexing means for use with a toothed indexing disc and consisting of a pivoted pawl having a principal stop engaging in the teeth of the disc to arrest the same, and a feeler or auxiliary stop spring-urged and pivotable relative to the main or principal pawl and spaced a predetermined fraction of the distance between the disc teeth from the main stop such that one or the other pawl stop will drop into the notch between adjoining disc teeth to arrest the latter without danger of the so-called dead-center stop aforesaid.

It is an object also to afford to new pawl mechanism of general application for arresting a ratchet or toothed member with greatly reduced danger or likelihood of the pawl means catching or hooking near the apex of a tooth, instead of seating home fully in between adjacent teeth, for the purpose of reducing the occurrences of slippage, especially in those mechanism in which the relative movements of the ratchet or toothed member and the pawl means cannot be regulated reliably for absolute register of the cooperating parts at all times.

Additional objects and aspects of novelty and utility in the invention relate to details of construction and operation which will appear as the following description of the illustrative embodiment develops in view of the accompanying drawing in which:

Fig. 1 is a sectional view through a score register unit showing in elevation the novel indexing means;

Fig. 2 is a top plan view of the indexing means;

Fig. 3 is a magnified fragment of the indexing disc showing the index pawls or stops in a normal indexing condition;

Fig. 4 is another magnified fragment of the indexing disc illustrating a so-called hung-up, hooked, or dead-center condition;

Fig. 5 is another magnified fragment of the indexing disc illustrating another possible abnormal operating condition of the pawls.

In Fig. 1 is shown part of a score control unit or totalizer such as is commonly used in various types of coin-operated amusement game and the like, said unit including an upright insulated panel 10 on which are a plurality of concentrically circular groups, 11, 11A, 11B . . . etc. of electrical contacts which are connected in various score and control circuits, the details of which are not relevant to the present improvements.

Such a score control unit also includes a shaft 12 which is rotated constantly (while the game is in operation) by means of a small motor (not shown), and this shaft serves to drive a plurality of switch contact blades or arms 13, 13A, 13B . . . etc. through the medium of a known type of slip clutch of the friction disc type, which includes a metal disc 14 fast on shaft 12 and spring-urged against a friction disc of rubber or leather, as at 15, which is fast with the contact arms 13, 13A, 13B . . . , such that if said contact arms are not restrained and are free to rotate, they will be carried around by said clutch means with said shaft 12, to cause the said contact arms to sweep over their respective banks of contacts 11, 11A, 11B . . . etc. until such time as said contact arms are restrained.

Means for arresting or restraining the aforesaid motion of the contact arms includes an index disc 16 having peripheral indexing teeth 17; this disc is keyed or fast with said contact arms such that, if the main pawl stop 18 is engaged in said teeth, the frictional effort of the slip clutch means is overcome so that shaft 12 continues to rotate, but the contact arms 13 remain at rest.

The main pawl stop 18 is part of pawl lever 19 pivoted at 20 on post 21 and normally urged counterclockwise by spring 22 so as to project said stop 18 into stopping engagement with the indexing disc.

Means for releasing the pawl includes a solenoid 23 adapted to be energized by circuit connections in the game (not shown) at certain times, with the result that plunger 24 is attracted downwardly, and through pivotal connection 25 with the end of the pawl rocks the latter clockwise to withdraw stop portion 18 from the teeth of the indexing disc. When the control circuit for the solenoid is de-energized or broken, spring means including spring 22 restores the pawl to indexing position.

In prior types of indexing mechanism of this class, it often happened that the upper edge of the stop 18 hooked, stuck, or caught on the tip of one of the indexing teeth, and the forces acting were sufficient to arrest the disc without the pawl stop ever dropping to the root of the tooth in a proper manner. In consequence of this kind or dead-center stopping, one of several annoying things would result; either the switch contact arms 13, 13A . . . etc. would fail to stop squarely on a proper contact button 11, 11A . . . etc. or the dead-center condition might persist for a while and then suddenly the pawl would drop into place with a consequent movement of one of the switch arms onto or off a contact, and a corresponding sudden change in the condition of the scoring circuit, with the result that the player or observer of the score or register instrumentalities in the circuits controlled by said switch contacts would be puzzled or annoyed by a sudden and mysterious change in conditions.

Such irregular operating peculiarities of the indexing means arose from the fact that the slip-clutch mechanism made it possible for the index disc to gain or lose slightly relative to a proper indexing position, and since the disc and pawl are in motion, relatively, simultaneously when the indexing operation is going forward, and production items of this class cannot be held to ideal tolerances, it is virtually impossible to keep the old type of indexing mechanism adjusted for avoidance of this dead-center trouble.

In accordance with this invention, an improved pawl means is provided which overcomes the dead-center indexing difficulties in a simple and efficient manner by use of what amounts to a compound pawl or stop structure which will stop the index disc at its proper place regardless of dead-center relations and irregularities in advance of the disc.

Referring to Fig. 1, the principal pawl stop 18 is seen to be a small bracket secured, as by spot welding, to the main pawl lever arm 19; this bracket appears clearly in Fig. 2, also.

Staked into the lever arm 19 is a pin 28, upon which is pivotally carried a secondary or auxiliary pawl stop 29 (Figs. 1 and 2) having a U-shaped offset 29A (Fig. 2) with aligned holes engaging the pin 28. Coiled on said pin (Fig. 2) is a spring 30, one end 31 of which (Fig. 1) bears up against the offset bight portion 19A of the main pawl lever which engages its pivot pin 20, while the other end 32 of said spring bears up against a lower edge of the secondary pawl 29 (Fig. 1) to urge said pawl counterclockwise, and hence in a direction to engage the same in the teeth of the indexing disc, whereas spring 22 urging the main pawl lever 19 counterclockwise tends to dispose the main pawl 18 in said teeth.

The spacing between the main and auxiliary pawls 18 and 29 is important, said spacing being preferably between 10/1000 and 15/1000 of an inch greater than the distance between successive indexing teeth; also, preferably, at least the upper leading edge 29X of the auxiliary stop or feeler pawl (Figs. 1 and 2) is beveled or slanted to facilitate slippage of the auxiliary pawl from the apex portions of the index teeth.

In Fig. 3 is illustrated, to magnified scale, the normal, intended disposition of the indexing pawls or stops in the disc teeth; this condition exists in about 99 per cent of the indexing operations where the speed of the pawls is empirically adjusted to be relatively slower than the advance of the teeth. Attention is called to the spacing of main pawl 18 from tooth 17B.

In Fig. 4 is illustrated to magnified scale, and approximately, the occasional situation where the auxiliary pawl 29 has hung-up or hooked on tooth 17A, while the main pawl 18 is fully home and will hold the disc in properly indexed position even if the auxiliary pawl 29 should be jarred loose or let go, which is almost certain owing to vibration from other mechanisms associated with the apparatus.

It should be noted that the auxiliary feeler pawl 29 has its upper or leading edge portion 29X disposed normally in advance, that is, in an upward sense, of the leading edge or main pawl 18, by reason of the action of spring 30. The amount of lead is limited by a stop arm 34 spot welded onto the bight portion 29A of the auxiliary pawl, as at 35; this stop arm engages under main pawl 18 to hold the auxiliary pawl in a predetermined condition of lead or advance over the main pawl. In Fig. 1 the main pawl 18 has fully gone home to the root of the teeth, so that the vertical spacing between arm 34 and the bottom edge of pawl 18 indicates the amount of lead permitted when plunger 24 is attracted.

In Fig. 5, the condition, to magnified scale, is illustrated wherein the auxiliary pawl 29 hits on the tooth apex and yields, while the main pawl 18 goes home and stops with tooth 17A on the lead side of the latter; this would also be the case after slippage from the condition of Fig. 4. It will be appreciated that the actual operating conditions are dynamic, with disc 16 and pawls 18 and 29 all in relative motion, so that the showing of the possible conditions is approximate and exaggerated, in view of the slight clearances, for purposes of illustration.

Fig. 1 illustrates the condition magnified in Fig. 3, wherein the auxiliary pawl or feeler 29 has arrested the disc with the main stop in advance of the leading tooth. The drawings illustrate only approximately the static conditions of normal and abnormal operation, and it must be appreciated that the true operating conditions exist under dynamic circumstances with the disc and the compound pawls in relative motion.

It will be appreciated that the improved indexing means is useful in applications other than that suggested for purposes of illustration herein, and that the invention, in its broader aspects affords a compound indexing pawl means including at least two feelers or pawls, one carried by the other and yieldingly disposed in advance of the other, relative to the teeth of the index disc, such that, by reason of spacing between said pawls, one or the other will engage and arrest the disc, thereby obviating dead-center or false indexing.

Referring to Fig. 3, the assumed direction of rotation of the index disc 16 is counterclockwise as indicated by the arrow on the disc.

The straight edges of the teeth 17 (one of which is shown engaged with the pawl 29, are considered herein for descriptive purposes as the leading edges of the teeth, in the sense that they are foremost in the direction of motion of the disc.

The slanted edges of the teeth 17 are considered for descriptive purposes as the trailing edges since they are behind or rearward of said straight leading edges, relative to the direction of travel of the disc.

The rather narrow lands on said teeth, disposed between said leading and trailing tooth edges, are considered as the apex portions of the teeth.

Still regarding Fig. 3, the two lefthand vertical faces of the pawls 18 and 29 are considered as the trailing faces of the pawls; and the two righthand vertical faces of said pawls or stops are considered as the leading faces or sides of said stops or pawls.

And further, the two innermost vertical and opposite faces of said pawls are considered as the confronting faces of the pawls.

The spacing between the pawls is important, and, as illustrated in Fig. 4, the distance between the two leading faces 18L and 29L of the two pawls is greater than the distance between the leading edges 17L of any pair of successive disc teeth; likewise, the distance between the trailing faces 18T and 29T of the pawls is greater than the distance between the leading edges 17L or the trailing edges 17T of any two successive teeth. The foregoing measurements refer to the apex regions of the teeth, since it is in this region that the critical engagements between the pawls and teeth occur upon movement of the pawls toward stopping engagement with the teeth. Once any pawl can move in between two teeth, proper stopping or indexing is assured, even if one of the pawls should be hung-up, as in Fig. 4.

Thus, in the operation of the device, the following situations may occur: the two pawls 18 and 29 may simultaneously strike the two narrow flats or lands at the apices of a pair of teeth, and the disc could continue to move, in which case the pawl 29, being free to pivot independently of the pawl 18, can move to enter a tooth notch in any event as the disc continues to rotate; but the stoppage will occur within a distance of one tooth of the continued travel.

The analogous situation is shown in Fig. 5 wherein only one pawl 29 may strike a land at a point where the other pawl 18 is ahead of its tooth but drops fully home to the root of the tooth while the pawl 29 yields and remains on the land. Had it happened that the pawl 18 had struck a land at a point and with a pressure sufficient to stop the movement of the main lever 19, it will be apparent that the pawl 29 would nevertheless have been effective to drop into the first space presented (either by continued driving movement of the disc or by a jarring movement thereof) so that the disc could not in any case overtravel by a distance greater than one tooth. Still other situations have been explained in view of Figs. 1, 3, and 4.

Thus it will be apparent that the spacing of the pawls and teeth is such that the pawls may simultaneously move into the spaces flanking any tooth; or they may both respectively engage the apex portions or lands of adjoining teeth at a given instant; or one pawl may enter between two teeth while the other engages an apex portion of a third tooth; and in any case, the disc can never overtravel an intended indexed position by more than one tooth because one or the other pawl must drop home, no matter which way the disc moves from any cause, it being noted that the disc 16 could move in reverse directions owing to the slip clutch drive.

Conformably with the requirements of Sec. 4888 of the Revised Statutes, the foregoing specification describes the invention and discovery in terms to enable those skilled in the art to make and use the same and to distinguish the same from other inventions, and it is contemplated that modifications and variations of the illustrative form of the invention shall be included in the fair scope thereof and the scope of the disclosures originating herein and of the appended claims, which are intended to particularly point out and distinctly claim, without repeating the foregoing specifications, what is claimed as the invention and discovery, conformably with said statutes.

The invention claimed is:

1. Indexing mechanism comprising, in combination with a rotatable disc having substantially uniformly spaced teeth each having a leading and trailing edge converging into an apex portion, a lever pivoted to rock in a plane approximately parallel to that of said disc in directions radially toward and away from the latter, a main pawl member fixed on said lever for movement by the latter in between succeeding teeth of said disc, a first spring acting on said lever to urge the same into a normal position with said main pawl member urged in a direction in between successive teeth as aforesaid, a second pawl pivotally mounted with said lever for movement in the same directions as the latter, a second spring acting to pivot said second pawl for movement in between succeeding teeth and further acting to pivot said second pawl toward said teeth in advance of the first pawl in a radial direction, a stop for the second pawl and engageable with the first pawl to limit the aforesaid radial advance of the second pawl relative to the first pawl, said pawls being spaced apart in the direction of travel of said teeth a distance greater than the distance between the leading edges of any pair of successive teeth and less than the distance between succeeding trailing edges measured at the apex, and electromagnetic means acting to move said lever to withdraw said pawls from said teeth.

2. Indexing mechanism comprising a toothed index disc, an index lever movable toward and away from the teeth on said disc, means for moving the lever as aforesaid, and at least two feeler pawls carried on said lever, one particular pawl being movable relative to the other in the directions of movement of said lever, said particular pawl being yieldably urged against a register stop on the other pawl and in advance of said other pawl in a radial direction toward the disc, the leading and trailing sides of said particular pawl being spaced from the leading and trailing sides of the other pawl in a direction motionwise of the disc by an amount greater than the distance between the leading margins of adjoining teeth, and approximately equal to the distance between the trailing edge of one tooth and the leading edge of the following tooth.

3. Mechanism as set forth in claim 2 and further characterized in that said particular pawl has an upper tooth-engaging edge between the leading and trailing sides thereof and which is slanted to provide a sharp lateral edge for slippage relative to a tooth engaged thereby in the apex region thereof.

4. Indexing mechanism including a rotated index disc having uniformly spaced teeth, a compound pawl having at least two feeler pawls in the form of thin bars extending transversely of the plane of the disc and teeth, both pawls being spring-urged for joint movement toward said teeth and one of said pawls being urged in advance of the other a predetermined amount toward said teeth, means for moving said pawls jointly toward engagement with said teeth, said pawls being constructed and spaced apart in the direction of travel of the disc and teeth such that both pawls may enter the spaces flanking any tooth, and also may respectively engage the apex portions of adjoining teeth simultaneously, and also such that one pawl may enter between adjoining teeth while the other pawl engages the apex portion of another one of said teeth, dependently upon the angular position of the disc and teeth relative to the pawls at the time of approach of the pawls into indexing engagement with the teeth.

5. Indexing mechanism comprising, in combination with a rotatable disc having substantially uniformly spaced teeth each having a leading and trailing edge converging into an apex portion, a lever pivoted to rock in a plane approximately parallel to that of said disc in directions radially toward and away from the latter, a main pawl member fixed on said lever for movement by the latter in between succeeding teeth of said disc, a first spring acting on said lever to urge the same into a normal position with said main pawl member urged in a direction in between successive teeth as aforesaid, a second pawl pivotally mounted with said lever for movement in the same directions as the latter, a second spring acting to pivot said second pawl for movement in between succeeding teeth and further acting to pivot said second pawl toward said teeth in advance of the first pawl in a radial direction, a stop for the second pawl and engageable with the first pawl to limit the aforesaid radial advance of the second pawl relative to the first pawl, said pawls being spaced apart and of dimensions relative to said teeth to be capable of fitting into the spaces on opposite sides of any tooth, and also to be engageable simultaneously each with one of the apex portions of successive teeth, and also such that one pawl can engage between one pair of succeeding teeth while the other pawl engages with an apex portion of an adjoining tooth, together with electromagnetic means operable to move said lever to withdraw said pawls from stopping relation to said teeth.

6. In an indexing mechanism for a rotatable, toothed, index wheel, a pair of relatively movable pawls jointly movable as a unit toward engagement with the teeth of said wheel, one of said pawls being yieldingly held a predetermined amount in advance of the other radially toward said teeth, said pawls each having a narrow tooth-engaging blade and edge and each said edge being adjoined by a trailing and leading pawl face, said faces being the opposite sides of said blades, said faces and edges lying in planes approximately parallel with each other and the axis of the wheel, so as to extend transversely of said teeth, said pawls having mutually confronting faces, one leading and one trailing, spaced apart motionwise of the wheel a distance less than the distance between the leading edges of successive teeth and approximately equal to the distance between the trailing edge of one tooth and the leading edge of a following tooth measured at the apices thereof; and the distance between the trailing edges of successive teeth, measured as aforesaid, being greater than said distance between said confronting pawl faces at the tooth-engaging edges thereof, the thickness of said blades being substantially less than the spacing between adjacent teeth both at the apices and roots.

7. Indexing pawl mechanism for stopping a yieldably driven ratchet disc having uniformly spaced teeth each of which has a leading edge and a trailing edge joining with an apex portion, said pawl mechanism comprising, to wit: an indexing lever movable toward and away from said teeth and including a main pawl for engagement with said teeth, an auxiliary pawl mounted on said lever for movement relative to said teeth in the same sense as the main pawl, said pawls having tooth-engaging parts which are of substantially less thickness than the width of the spaces between teeth and which thickness is not greater than the width of said teeth at the apex portion measured in the direction of travel of the teeth; said auxiliary pawl being spaced behind the main pawl, relative to the direction of travel of the teeth, by an amount permitting of the movement of both pawls into spaces flanking a tooth, or respectively onto the apex portions of adjoining teeth, or with one pawl on an apex portion and the other pawl disposed at some point in between a pair of adjoining teeth, depending upon the position of the teeth relative to the pawls at the time of initial indexing engagement of the same, and means yieldingly urging the auxiliary pawl a predetermined amount closer to the teeth than the main pawl.

8. In an indexing mechanism for stopping a toothed rotary member by an indexing pawl with minimized overtravel after the pawl is actuated in stopping operation, improvements comprising, to wit: the combination with a rotatable disc having indexing teeth uniformly spaced for angular travel with the disc, and each having a leading edge which is approximately radial and a trailing edge which slopes backwardly from the leading edge relative to the direction of rotation, together with a narrow land at the apex of the tooth between said edges; an indexing lever pivoted to rock toward and away from said teeth in an approximately radial sense, a main pawl movable with the lever and adapted to fit into the space between any pair of successive teeth, an auxiliary pawl mounted on said lever at one side of the main pawl in the direction of travel of the disc to move toward and away from said teeth in the same sense as the main pawl and being adapted to fit in between any pair of successive teeth at a position at least one tooth away from the inter-tooth space which the main pawl would occupy as aforesaid, spring means for moving the auxiliary pawl radially in advance of the main pawl toward said teeth a predetermined amount, stop means limiting the advance of the auxiliary pawl the amount aforesaid, each of said pawls having a leading and a trailing side with an intervening tooth-engaging edge, the spacing of said pawls being related to the spacing of said teeth such that the distance between the respective leading or trailing sides of the pawls is greater than the distance between the respective leading and trailing edges of any pair of successive teeth at the apex region thereof, at least; and said tooth-engaging edges are spaced so as to be each capable of engaging one of the lands of any pair of successive teeth at the same time, provided the disc is in the proper angular relation thereto, said pawls each being dimensioned to fit in between any pair of said teeth, whereby said pawls may be moved in indexing relation to said teeth by actuation of said lever, and one or the other of said pawls will move in between a pair of teeth when the disc is stopped thereby, regardless of whether one or both pawls engages a tooth land while said disc is in motion or whether the disc is stopped without a pawl entering fully in between any pair of teeth.

9. Indexing mechanism comprising an index disc having peripheral indexing teeth each with a leading edge and a trailing edge and a narrow land in between said edges, means including a yieldable coupling for rotating said disc, a lever pivotable in a radial sense toward and away from said teeth, a main stop pawl on said lever, a leading auxiliary stop pawl pivoted on said lever for movement relative to said teeth in the same sense as the lever, but in a leading position ahead of the main pawl relative to the direction of travel of the teeth, means for limitedly moving the auxiliary pawl relative to the main pawl in a direction toward said teeth, said pawls each including a blade portion extending transversely of the movement of said teeth and of a thickness less than the distance between successive teeth so as to be capable of moving in between the latter; each pawl blade portion having a narrow transverse edge for engagement with said lands; each blade portion having a leading face and a trailing face situated in a plane transverse to the movement of the teeth and adjoining said transverse edge; said blade portions being spaced such that the distance between the leading face of the leading pawl blade and the trailing face of the other is greater than the distance between the leading and trailing edges of any pair of successive teeth; and the distance between the respective trailing faces or the respective leading faces of said blade portions does not exceed the distances between the leading edge and the trailing edge of successive teeth measured at the apices thereof, so that both, or either, of the pawl blade portions may enter in between the teeth, and one or both of said pawl edges may respectively engage the lands of adjoining teeth, depending upon the angular position of the teeth at the time of approach of said pawls to the teeth for indexing purposes, whereby to limit the possible slippage of said disc in indexing operation of the pawls as aforesaid to a maximum of one tooth following engagement of any said pawl edge with any tooth land or entry of either pawl blade portion any amount in between any pair of succeeding teeth.

10. For use with a ratchet wheel having uniformly spaced teeth with leading and trailing edges flanking an apex portion, indexing pawl means comprising an indexing lever pivoted for movement toward and away from said teeth, a thin blade portion constituting a main pawl moved by said lever to engage between said teeth, an auxiliary pawl pivoted on said lever and including a thin blade portion spaced behind the main blade portion to engage between said teeth at a point at least one tooth removed from the engaging point of the main pawl, said blade portions being of a thickness approximating the width of the apex portion of any tooth, measured between the leading and trailing edges at the apex, whereby said blade portions are respectively capable of entering into the spaces flanking any tooth, or simultaneously lodging respectively on apex portions of adjoining teeth, or lodging with one blade portion on the apex part of a first tooth, and the other blade portion entered into the space between a second and third tooth on one side or the other of said first tooth, means yieldingly pivoting and normally locating the auxiliary pawl blade radially nearer to the teeth than the main pawl, and means for moving said lever to engage and disengage the pawls with said teeth.

DONALD E. HOOKER.

REFERENCES CITED

The following references are of record in the file of this patent:

UNITED STATES PATENTS

| Number | Name | Date |
|---|---|---|
| 300,216 | Chisholm | June 10, 1884 |
| 383,040 | Burton | May 15, 1888 |
| 658,564 | Conner | Sept. 25, 1900 |
| 1,192,489 | Anglada | July 25, 1916 |
| 1,549,399 | Williams | Aug. 11, 1925 |
| 1,832,805 | Brewster | Nov. 17, 1931 |
| 2,094,777 | Ellinger | Oct. 5, 1937 |
| 2,391,470 | May | Dec. 25, 1945 |